United States Patent [19]

Buckholz, Jr. et al.

[11] Patent Number: 4,960,603

[45] Date of Patent: Oct. 2, 1990

[54] USE OF SCLAREOLIDE IN AUGMENTING OR ENHANCING THE ORGANOLEPTIC PROPERTIES OF FOODSTUFFS

[75] Inventors: Lawrence L. Buckholz, Jr., Middletown; Mohamad I. Farbood, Holmdel, both of N.J.; Nicolas Kossiakoff, Chambourcy, France; Lewis G. Scharpf, Fair Haven; Eugene W. Seitz, Middletown, both of N.J.

[73] Assignee: International Flavors & Fragrances Inc., New York, N.Y.

[21] Appl. No.: 534,880

[22] Filed: Jun. 8, 1990

Related U.S. Application Data

[63] Continuation-in-part of Ser. No. 474,410, Jan. 2, 1990, which is a continuation of Ser. No. 418,171, Sep. 29, 1989, Pat. No. 4,917,913.

[51] Int. Cl.$^5$ .................... A23L 1/226; A22C 25/00
[52] U.S. Cl. ................................. 426/536; 426/643; 426/652
[58] Field of Search ..................... 426/536, 652, 643

[56] References Cited

U.S. PATENT DOCUMENTS 4,917,913  4/1990  Buckholz ........................ 426/536

OTHER PUBLICATIONS

Fernandez, et al., (PhytoChemistry), vol. 24, No. 1, pp. 188–189, 1985, (abstracted at Chem.Abstracts, vol. 102:128829u).
Keneko in Agr.Biol.Chem., vol. 35, No. 9, pp. 1461–1462, 1971, (The Aroma of Cigar Tobacco, Part II/Isolation of Norambreinolide from Cigar Tobacco) (abstracted at Chem.Abstracts, vol. 76, 1972, 56811b).
Wahlberg et al., Acta Chemica Scandinavica B 33 (1979), pp. 541–543, (Title: "Tobacco Chemistry," 49, New Labdanic Diterpenids Isolated from Tobacco) (abstract at Chem.Abstrs. vol. 92:19004a).
Teresa, et al., An. Quim. 1979, 75(5), 335–40, (Abstrs. at Chem. Abstracts vol. 91:137149d).

*Primary Examiner*—Joseph Golian
*Attorney, Agent, or Firm*—Arthur L. Liberman

[57] ABSTRACT

Described is the use of sclareolide in augmenting or enhancing the organoleptic properties of foodstuffs whereby:
(i) richness and creaminess is added to low fat ice cream by admixing therewith the sclareolide;
(ii) sweetness of foodstuffs and beverages caused by non-neutrative sweetners e.g., aspartame, is enhanced by admixing with the non-neutrative sweetener, prior to addition to the beverage of foodstuff, sclareolide;
(iii) bitter nuances imparted by the use of potassium chloride in salt substitutes are substantially covered by means of admixing such salt substitutes with sclareolide;
(iv) saltiness of foodstuffs caused by such salts as sodium chloride is enhanced (and the required concentration of such salts in such foodstuffs from an organoleptic standpoint is thereby reduced) by means of admixing with the salt, prior to addition to the foodstuff, sclareolide; and
(v) mouthfeel is imparted to, and aesthetically pleasing flavor nuances are enhanced in textured seafood products such as surimi by means of addition to either the textured seafood product itself or to a flavor enhancing or augmenting product which is then added to the seafood product, sclareolide.

1 Claim, No Drawings

USE OF SCLAREOLIDE IN AUGMENTING OR ENHANCING THE ORGANOLEPTIC PROPERTIES OF FOODSTUFFS

RELATED ISSUED PATENT AND CO-PENDING RELATED PATENT APPLICATION

This application is a continuation-in-part of application for U.S. patent, Ser. No. 474,410 filed on Jan. 2, 1990, which is a continuation of application for U.S. Letters Patent, Ser. No. 418,171 filed on Sept. 29, 1989, now U.S. Pat. No. 4,917,913 issued on Apr. 17, 1990.

BACKGROUND OF THE INVENTION

1. Field of the Invention

The present invention relates to foodstuffs having improved taste quality, more particularly, aftertaste quality. The present invention also relates to the use of sclareolide having the structure:

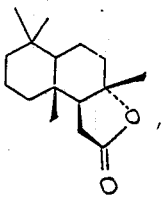

in enhancing the salinity effect of sodium chloride (referred to herein as a 'salt sparing' effect) or in debittering potassium chloride used as a substitute for sodium chloride in such foods as soups. The present invention also relates to the enhancement of food flavors using sclareolide having the structure:

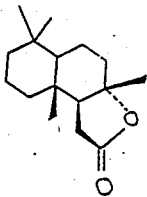

as the flavor enhancer. Thus, the present invention also relates to the use of sclareolide having the structure:

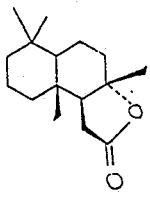

as at least a partial fat replacer to be used in diary products such as ice cream, sour cream and whipped toppings. The present invention also relates to the use of sclareolide having the structure:

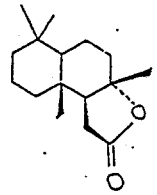

as a modulator to reduce or eliminate the alternate of artificial sweeteners such as aspartame.

2. Description of the Prior Art and Discussion of the Background

Taste qualities of foodstuffs change depending on the composition of taste components contained therein. When foodstuffs have miscellaneous tastes or an unpleasant taste, various improvements can be made by adjusting the composition. Among low calorie sweeteners, the use of which has been rapidly growing recently, for example, aspartame is characterized as a sweetener free from a bitter or astringent taste or an irritating taste and having a refreshing sweetness. However, aspartame is somewhat insufficient in rich tasteness in terms of sweet quality. Further, aspartame has a tendency to impart a sweet aftertaste, as is characteristically noted with sweeteners having a high titer. To improve such a sweet quality of aspartame, various proposals have been made (Published Unexamined Japanese Patent Application Nos. 90667/77, 148255/81, 63068/82, 141760/83, etc.).

However, the purpose of improving sweet quality of aspartame and imparting satisfaction comparable to that of sugar have not been sufficiently achieved. Further the method of using these various taste components in combination requires the component used in combination in a weight almost the same as or larger than that of aspartame, in most cases. From an aspect of rendering a low calorie or general purpose use, a further improvement has been desired.

In addition, tastes such as an astringent taste of the like, especially a different flavor or miscellaneous flavors left on the tongue as an aftertaste tend to adversely affect the taste quality of foodstuffs as a whole. In such a case, even though a beforetaste, etc., is of good quality, the taste quality tends to be lowered as a whole due to the unpleasant aftertaste and it becomes necessary to improve the whole taste from the beforetaste to aftertaste.

It is well known that the combination of monosodium L-glutamate (MSG) and a flavor inducing 5'-nucleotide, such as disodium inosine-5'-monophosphate (IMP), disodium guanosine-5'-monophosphate(GMP), or mixtures thereof, exhibit a synergistic flavoring activity. Moreover, mixtures comprising MSG and a flavor inducing 5'-nucleotide have long been widely used as economical flavoring agents or seasoning agents for various foods and beverages.

U.S. Pat. No. 4,258,072 issued on March 24, 1981 discloses a mixed seasoning comprising 100 parts by weight monosodium glutamate; 0.05 to 25 parts by weight of a flavor inducing 5'-nucleotide; 5.0 to 38.0 parts by weight of sodium chloride; 0.1 to 0.87 parts by weight succinic acid and/or sodium succinate; and 0.5 to 10.0 parts by weight of at least one alkali metal salt of an organic acid which may be sodium fumarate, sodium citrate, sodium or calcium lactate, sodium maleate, sodium tartrate, sodium ascorbate or sodium aspartate.

U.S. Pat. No. 4,216,244 issued on Aug. 5, 1980 discloses a low sodium seasoning which includes potassium chloride as its major ingredient together with other nonsodium compounds masking the bitterness of the potassium chloride so that the seasoning can be substituted for sodium chloride seasonings.

U.S. Pat. No. 4,216,244 specifically discloses a low sodium salt seasoning consisting by weight of a mixture of about 90 percent low sodium salt base and about 10 percent low sodium diluent, with the base consisting by weight of a mixture of about 92 percent potassium chloride, about 3 percent L-glutamic acid and about 1 percent each of monopotassium glutamate, potassium citrate and potassium phosphate.

U.S. Pat. No. 4,066,793 issued on Jan. 3, 1978 discloses seasoning compositions, and processes for their production, which have an improved and enhanced meat-like flavor, and comprise mixtures containing extracts of yeast autolysates, 5'-nucleotides, sodium chloride and potassium salts; the potassium ion concentration being more than 0.5 times the sodium ion concentration.

Yamada in German Offenlegungsschrift No. 31 44 166, French Patent No. 2,493,681 and Japan Published Application No. J57-079860 discloses a seasoning composition which may be either:

|      | Weight Percent |                      |
|------|----------------|----------------------|
| (i)  | 15-21          | magnesium chloride;  |
|      | 3-10           | magnesium sulfate;   |
|      | 2-4            | potassium chloride;  |
|      | 0.2-0.5        | magnesium bromide; and |
|      | 2-7            | sodium chloride; or  |
| (ii) | 15-21          | magnesium chloride;  |
|      | 6-9            | magnesium sulfate;   |
|      | 2-4            | potassium chloride;  |
|      | 0.2-0.4        | magnesium bromide;   |
|      | 2.6            | sodium chloride; and |
|      | 0.1-21         | calcium chloride     |

The Yamada patents and patent applications indicate that when the salt composition is diluted, it does not give bitterness but gives a round taste and gives rise to intensity of the saltiness of common salt.

Issued Japanese Patent No. J82-022311 discloses a synergistic seasoning composition containing monosodium glutamate, a nucleic acid type tasting compound, sodium chloride, succinic acid salt and at least one othr sodium salt. The seasoning is composed of:
(i) monosodium glutamate;
(ii) nucleic acid-type tasting substance such as disodium inosine-5'-monophosphate and/or disodium guanosine-5'-monophosphate;
(iii) sodium chloride;
(iv) succinic acid and/or sodium succinate; and
(v) at least one salt selected from the group consisting of monosodium furmarate, trisodium citrate, monosodium lactate, calcium lactate, disodium malate, disodium tartarate, sodium ascorbate and monosodium aspartate.

The abstract of Japanese Patent No. J8/2022311 is as follows:

Derwent Abstracts ("FOODOC"/January, 1983)

"Synergistic seasoning compsn.-contains monosodium glutamate, nucleic acid type tasting cpd., sodium chloride succinic acid salt and at least one other sodium salt. The seasoning is composed of (1) monosodium glutamate, (2) nucleic acid-type tasting substance (e.g., disodium inosine-5'-monophosphate and/or disodium guanoisine-5'-monophosphate), (3) sodium chloride, (4) succinic acid and/or sodium succinate and (5) at least 1 salt selected from monosodium fumarate, trisodium citrate, monosodium lactate, calcium lactate, disodium malate, disodium tartarate, sodium ascorbate and monosodium aspartate. The ratio (1):(2)=1:0.0005–0.25, esp. 1:0.001–0.15; (1)+(2):(3)=1:0.05–3, esp. 0.07–0.25 (1)+(2):(4)=1:0.0010–0.0070, esp. 1:0.0015:0.0055. (1)+(2):(5)=1:0.005–0.080, esp 1:0.010–0.070 (4) and (5) are expressed as the free acid. "By combining sodium chloride (4) and (5) the tasting strength of the seasoning can be increased and its taste made similar to that of monosodium glutamate."

U.S. Pat. No. 3,821,368 issued on June 28, 1974 discloses a therapeutic composition of an aqueous medium containing about 75–150 moles sodium ions; 5–50 moles potassium ions; 5–50 moles bicarbonate ions; 75–150 moles chloride ions and preferably containing about 1–30 moles magnesium ions and about 1–30 moles of $HPO_4=$ and/or $SO_4=$ ions with a solution having a pH of about 5.95–8.4 and an osmolality of about Japanese Patent No. J82/00777 issued on January 7, 1982 and abstracted at Chem.Abstracts, Volume 96:161168h discloses a salt composition for seafood preservation containing 0.15–1% sodium chloride and a mixture of magnesium sulfate and calcium sulfate (1:1) weight ratio. It is indicated the magnesium sulfate and calcium sulfate markedly improved the flavor of the food product.

U.S. Pat. No. 4,332,823 discloses a process for preparing a fabricated meat comprising the sequential steps of:
(a) emulsifying meat or meat by-products;
(b) admixing a salt, with the emulsified meat or meat by-products, in a weight-percent proportion of 1.5–3% based on the weight of the fabricated product, the salt being present in a proportion sufficient to extract salt soluble protein from the emulsified meat or meat by-products, the salt being selected from the group consisting of sodium chloride, potassium chloride, sodium phosphate, potassium phosphate, sodium polyphosphates and potassium polyphosphates;
(c) extracting the salt soluble protein from the meat and meat by-products;
(d) admixing texturized soy with the emulsified meat or meat by-products, extracted protein and salt;
(e) forming the mixture into a desired shape;
(f) blanching the shaped mixture in a temperature range of 170°–210° F.; and
(g) thereafter maintaining the moisture content of the fabricated meat and meat by-product in the range of up to about 70%, the weight-percent proportions of the ingredients being: meat and meat by-products: 77–92% and texturized soy: 8–20%.

U.S. Pat. No. 4,340,614 issued on July 20, 1982 discloses a stringently sodium-restricted dietetic salt in its preparation which consists of a mixture of from 60-85 weight percent potassium chloride; 10-30 weight percent potassium adipate; 2-5 weight percent potassium tartrate; 0.5-2 weight percent potassium glutamate; 0.5-2 weight percent adipic acid; and from 0.004 up to 0.06 weight percent of potassium inosinate and/or potassium guanylate.

Furthermore, the use of certain materials for enhancing the flavor of foodstuffs is well recognized in the art. One of the first materials widely utilized for this purpose was monosodium glutamate. More recently, 5'-nucleotides, particularly inosinates and guanylates, have been similarly utilized as flavor enhancers. These nucleotides have particularly have been used with meat and fish materials.

It has been recognized that certain pyrazines are present in coffee and other beverages. The use acetylpyrazines to impart popcorn-like flavors has been suggested. The use of tetramethylpyrazine, preferably with vanillin, to improve the flavor of cocoa and chocolate material is also known. In these instances the pyrazines are said to have actively imparted a particular flavor character or specific aroma note to a foodstuff or other product.

Nothing in the prior art discloses that sclareolide having the structure:

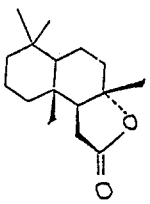

is useful as a fat replacer in ice cream whereby the mouthfeel effect caused by fat may be created using sclareolide as opposed to the fat in the ice cream.

Nothing in the prior art discloses that sclareolide having the structure:

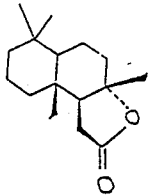

has a salt sparing effect whereby traces of sclareolide enhance the salinity of traces of sodium chloride and also reduce the bittering effect of sodium chloride substitutes such as potassium chloride.

Nothing in the prior art discloses the use of sclareolide having the structure:

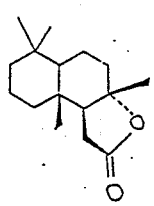

for accentuation or enhancement of flavor such as cheese flavors in snack applications particularly where the snacks are relatively low in fat content.

Nothing in the prior art discloses the use of sclareolide having the structure:

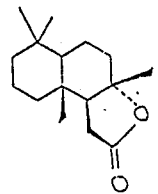

as an aspartame modulator particularly where the aspartame aftertaste is reduced or eliminated.

Fernandez, et al (PhytoChemistry, Volume 24, No. 1, pp. 188-189, 1985, (abstracted at Chemical Abstracts, Vol. 102:128829u) discloses the occurrence of sclareolide having the structure:

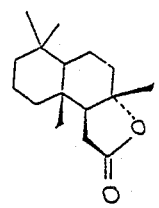

in *Sideritis nutans.*

Kaneko in Agr.Biol.Chem., Volume 35, No. 9, pages 1461-1462, 1971 (The Aroma of Cigar Tobacco, Part II/Isolation of Norambreinolide from Cigar Tobacco)-(abstracted at Chemical Abstracts Volume 76, 1972, 56811b) discloses the isolation of sclareolide having the structure:

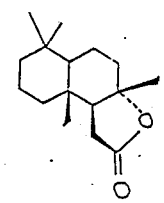

from cigar tobacco.

Wahlberg, et al, Acta Chemica Scandinavica B 33 (1979) pages 541-543 (title: "Tobacco Chemistry.49.-*New Labdanic Diterpenoids Isolated from Tobacco", (abstracted at Chemical Abstracts, Volume 92:19004a) discloses the occurrence of sclareolide having the structure:

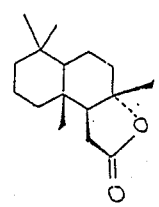

in tobacco.

Teresa, et al, An. Quim. 1979, 75(5), 335-40 (abstracted at Chemical Abstracts Volume 91:137149d) discloses the isolation of sclareolide having the structure:

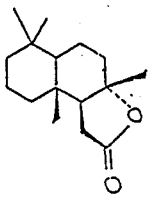

from the neutral part of the *C. Iadaniferus* gum.

THE INVENTION

Our invention resides in the use of sclareolide in augmenting or enhancing the organoleptic properties of foodstuffs (flavor and/or mouthfeel) whereby: and creaminess is added to low fat ice (i) richness cream by admixing therewith the sclareolide;

(ii) sweetness of foodstuffs and beverages caused by non-neutrative sweeteners, e.g., aspartame, is enhanced by admixing with the non-neutrative sweeteners, prior to addition to the beverage or foodstuff, sclareolide;

(iii) bitter nuances imparted by the use of potassium chloride and the like in salt substitutes are substantially covered by means of admixing such salt substitutes with sclareolide;

(iv) saltiness of foodstuffs caused by such salts as sodium chloride is enhanced (and the required concentration of such salts in such foodstuffs from an organoleptic standpoint is thereby reduced) by means of admixing with the salt, prior to addition to the foodstuff, sclareolide; and (v) mouthfeel is imparted to, and aesthetically pleasing flavor nuances are enhanced in textured seafood products such as surimi by means of addition to either the textured seafood product itself or to a flavor enhancing or augmenting product which is then added to the textured seafood product, sclareolide.

In all cases the amount of sclareolide added is in such a quantity that it is flavor augmenting or enhancing, or is mouthfeel augmenting, imparting or enhancing.

A. Sweetener And Astringent Quality Modulation

The taste of foodstuff especially a sweet aftertaste, an astringent aftertaste and other unpleasant aftertaste can be improved by means of the addition of sclareolide having the structure:

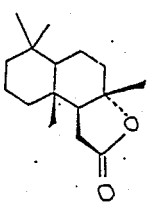

In the case of aspartame a sweet taste left on the tongue as an aftertaste imparts to those people experienced with the sweetness of sugar a reduced preferance but in the copresence of the sclareolide the aftertaste is cut and a taste quality more similar to sugar can be obtained. Further, in the case of tea, its aftertaste and astringent taste are restrained and a refreshing taste can be obtained.

In any case, a pleasant rich taste of foodstuffs is not compromised and the flavor of sclareolide is essentially nonexistent. That is, aftertaste of foodstuffs are improved and a refreshing taste quality free from a so-called luscious taste, or a shape taste can be obtained. Accordingly, not only in those cases presenting difficulties in aftertastes but also in cases where the taste of a foodstuff is desired to be improved to a refreshing or light taste is effective to incorporate sclareolide having the structure:

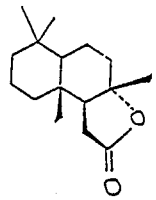

With respect to application of the sclareolide to foodstuffs the use in combination with chemical substances (oxobicyclooctane derivatives and the like) having an aroma or taste improving effect is disclosed in U.S. Pat. Nos. 4,197,328, 4,208,308, 4,225,470, 4,229,314, 4,273,662, 4,294,708, 4,198,398, 4,454,111 and 4,849,238 the specifications of which are incorporated herein by reference.

Kinds of foodstuffs to which the present invention may be applied (with respect to aftertaste) are not particularly limited but as described above, the sclareolide exhibits a marked effect in improving aftertaste such as a sweet aftertaste, or an astringent aftertaste. Therefore the present invention is highly effective for foodstuffs which have sweet and astringent components and in which improvement in taste quality is desired. Specific examples of foodstuffs having a sweet taste include various sweeteners (irrespective of forms, such as powders, granuals, cubes, paste and liquids), beverages such as carbonate beverages, milk beverages; foods, such as candies, fondants, icings, jellies, mousses, chocolates, cookies, cakes, ice creams, sherbets, chewing gums, sweet pickles, dressings, vinegars, sweet wines, etc. Examples of foodstuffs having an astringent taste include tea and foods containing components such as tannin; persimmons and the like. In the case of containing low calorie sweeteners such as aspartame which is a sweetener having a high titer, alitame, sucrarose, and the like, especially in the case of containing aspartame, aftertastes are improved and foodstuffs having a high preference can be obtained. In addition, the low calorie sweetener may also include saccharin, cyclamate, acesulfame, stevioside, ribaudioside, sugar-added stevia, glycyrrhizin, thaumatin, and the like. The amount of aspartame effective for improving the taste quality of low calorie sweeteners varies depending upon various conditions such as the kind or the concentration of sweetener, components used in combination, and the like. For example, in the case of aspartame, approximately 1 ppm to 1000 wt percent of sclareolide based on the weight of aspartame are preferred.

In matters other than foodstuffs, for example, toothpastes, gargles, oral drugs (including herb medicines) and the like, the taste quality can be markedly improved by incorporating the sclareolide therein. The effective concentration of the sclareolide can be the same in these other foodstuffs as in the above described foodstuffs.

According to the present invention the taste quality, especially aftertaste properties of foodstuffs and the like can be markedly improved by incorporating the sclareolide therein. The content of this component in a trace amount so that the taste quality of the foodstuff is not effected as a whole and texture is not damaged (but actually improved). Further, in the case of aspartame and the like sweet beverages and foodstuffs so sweet as having good qualities similar to sugar but having low caloric content can be provided.

B. Salinity Enhancement Or Potassium Chloride Debitterment

This invention, interalia, relates to the use in enhancing the taste of meat flavored, cheese flavored and savory flavored foodstuffs, animal foods and snacks, to wit:

(A) Dairy Type Foods (i) processed cheese;
(ii) cheese spread;
(iii) cheese dip;
(iv) cheese analogues and imitation cheese analogues;

(B) Animal Foods (i) dog foods;
(ii) cat foods;

(C) Savory Flavored Foods (i) extruded snacks;
(ii) crackers, pretzels, potato chips and the like;
(iii) meat sauces, white sauces and gravies;
(iv) casseroles;
(v) cheese sauces;
(vi) soups (instant and finished)
(vii) prepared meats and meat spreads;
(viii) meat and poultry analogues and extenders and the like;
(ix) margarine;
(x) salad dressings;
(xi) condiments;
(xii) seasonings and flavorings;
(xiii) meat and poultry (processed); and
(xiv) breading and stuffing.

We have found that potassium chloride and similarly acting salts partially restore saltiness to food compositions, e.g. soups having reduced concentration levels of sodium chloride and the like ... and this saltiness effect is *enhanced* and their bitterness is removed if sclareolide is present at a level below its threshold of taste (as more specifically set forth in the examples herein, infra).

In this aspect of our invention the sclareolide may for example, be used in conjunction with a composition of matter consisting essentially of:

(a) from about 0.25 up to about 0.80 mole percent (herein and hereinafter to be understood as meaning a percentage based on total moles of cations, anions, and substantially non-ionized organic acids) on a dry basis of a lactic acid/lactate species mixture having the structure:

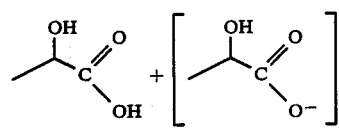

(b) from 0 up to about 0.09 mole percent on a dry basis of glycollic acid/glycollate ion species mixture having the structure:

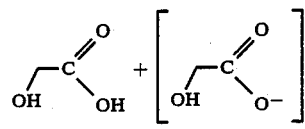

(c) from 0 up to about 10.0 mole percent on a dry basis of magnesium ion;
(d) from about 6 mole percent up to about 50 mole percent on a dry basis of a phosphate/monoacid phosphate/diacid phosphate/phosphoric acid species mixture having the formula:

$$[PO_4^{5-}] + [HPO_4^{2-}] + [H_2PO_4^-] + H_3PO_4$$

taken alone or taken further together with at least one of the species tripolyphosphate, pyrophosphate and/or polymetaphosphate (e.g., $K_5P_3O_{10}$; $K_4P_2O_7$; $[KPO_3]$ x respectively, wherein x represents a repeating number of monomeric units to form a polymer);
(e) from 0 mole percent up to about 40 mole percent on a dry basis of sodium ion;
(f) from about 8 mole percent up to about 50 mole percent on a dry basis of potassium ion;
(g) from about 0.3 mole percent up to about 16 mole percent on a dry basis of chloride ion;
(h) from 0 mole percent up to 30 mole percent on a dry basis of carbonate/bicarbonate/carbonic acid species mixture having the formula:

$$[CO_3^{2-}] + [HCO_3^-] + H_2CO_3$$

(i) from 0 mole percent up to about 2.0 mole percent on a dry basis of monobasic glutamate/dibasic glutamate/glutamic acid species having the formulae:

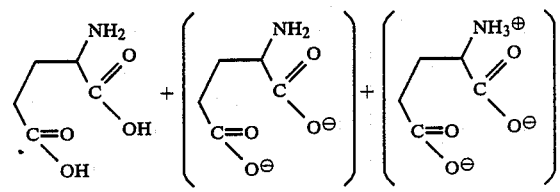

+

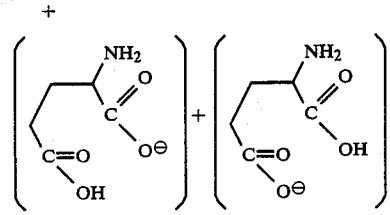

+

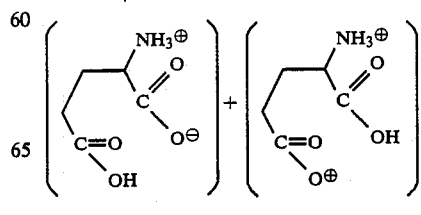

+

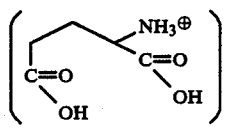

(j) from 0 up to about 0.6 mole percent on a dry basis of calcium ion; and (k) from about 0.1 up to about 0.6 mole percent on a dry basis of sclareolide having the structure:

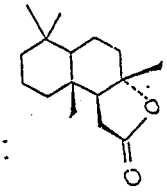

with the proviso that the sum total of mole percent on a dry basis of sodium ion, potassium ion, magnesium ion and calcium ion is from about 48 mole percent up to about 60 mole percent; and with the proviso that the sum total of carbonate/bicarbonate/carbonic acid ion species mixture having the structure:

$$[CO_3^=] + [HCO_3^-] + H_2CO_3$$

taken further together with the sum total mole percent on a dry basis of the phosphate/monobasic phosphate/dibasic phosphate species mixture having the formula:

$$[PO_4^\equiv] + [HPO_4^=] + [H_2PO_4^-] + H_3PO_4$$

taken alone or taken further together with the species tripolyphosphate, pyrophosphate and/or polymetaphosphate is from about 34 mole percent up to about 50 mole percent.

The foregoing composition when in aqueous solution (e.g., a soup such as chicken soup or clam chowder) has a pH in the range of from about 6 up to about 10.

In said aqueous solution, the concentrations of ion and acid species are:

(a) from about $2 \times 10^{-4}$ up to about $7 \times 10^{-4}$ moles per liter of the lactic acid/lactate ion species defined according to the structure:

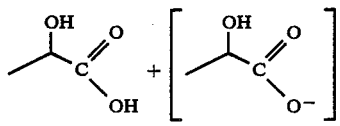

(b) from 0 up to about $9 \times 10^{-5}$ moles per liter of the species glycollic acid/glycollate ion defined accordingly to the structures:

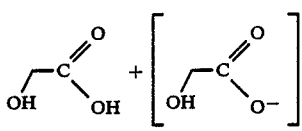

(c) from 0 moles per liter up to about $1.5 \times 10^{-3}$ moles per liter of the ion/acid species, glutamic acid/-monobasic glutamate/dibasic glutamate defined according to the structures:

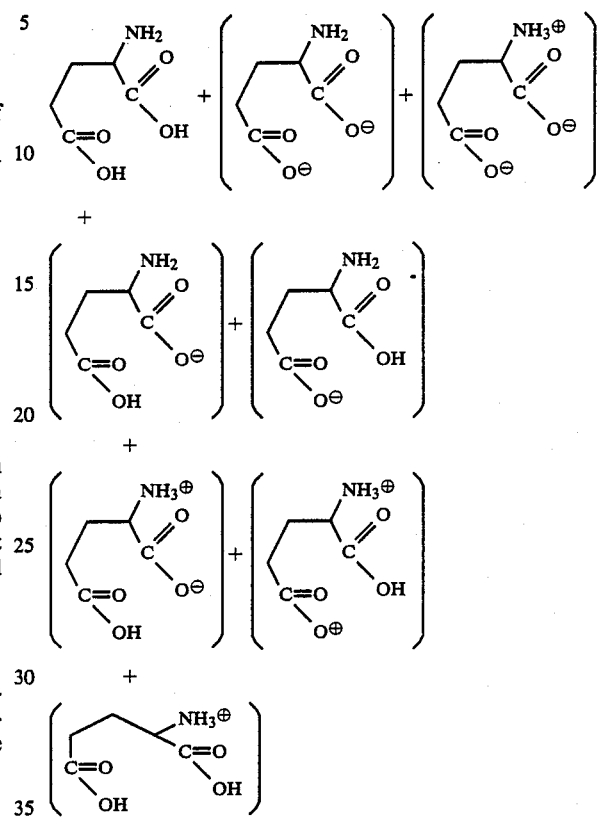

(d) from about $3 \times 10^{-4}$ up to about $1.6 \times 10^{-2}$ moles per liter of the chloride ion species;

(e) from about $3 \times 10^{-3}$ up to about $1 \times 10$ moles per liter of the acid/ion species, phosphoric acid/ion species, phosphoric acid/monoacid phosphate/diacid phosphate/phosphate having the formula:

$$[PO_4^\equiv] + [HPO_4^=] + [H_2PO_4^-] + H_3PO_4$$

taken alone or taken further together with the species tripolyphosphate (e.g., $K_5P_3O_{10}$); pyrophosphate (e.g., $K_4P_2O_7$); and/or polymetaphosphate (e.g., $[KPO_3]x$ wherein x represents a repeating number of monomeric units to form a polymer);

(f) from 0 up to about $2 \times 10^{-3}$ moles per liter of the ion/acid species carbonate/bicarbonate/carbonic acid having the formula:

$$[CO_3^=] + [HCO_3^-] + H_2CO_3$$

(g) from 0 up to about $4 \times 10^{-2}$ moles per liter of the sodium ion species;

(h) from about $4 \times 10^{-3}$ up to about $9 \times 10^{-2}$ moles per liter of the potassium ion species;

(i) from about 0 up to about $1 \times 10^{-2}$ moles per liter of the magnesium ion species;

(j) from about 0 up to about $6 \times 10^{-4}$ of the calcium ion species; and (k) from about $1 \times 10^{-3}$ about $6 \times 10^{-3}$ moles per liter of the sclareolide having the structure:

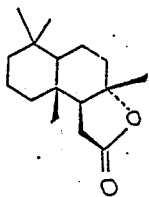

with the provisos:
(i) that the mole ratio of metal cation:total acid and ion is from about 0.4 up to about 0.7;
(ii) that the concentration of ions and acids is from about 0.04 up to about 0.25 moles per liter; and
(iii) that the range of concentration of metal cations is from about 0.02 up to about 0.15 moles per liter.

Preferably, the composition of matter of our invention is limited to a mixture of:
(i) from about 60 weight percent up to about 96 weight percent on a dry basis of a substance selected from the group consisting of (a) $KH_2PO_4$ or (b) $K_2HPO_4$ or (c) a mixture of $Mg_3(PO_4)\cdot 4H_2O$; and $K_2CO_3$;
(ii) from about 0.4 up to about 3.5 weight percent on a dry basis of lactic acid;
(iii) from about 0.4 up to about 17.0 weight percent on a dry basis of a compound selected from the group consisting of sodium chloride, postassium chloride and calcium chloride; and
(iv) from about 1.75 up to about 3.25 weight percent on a dry basis of monosodium glutamate or monopotassium glutamate of a mixture of same (with the proviso that the sum total of the ingredients cannot be greater than 100%).

More preferably, the composition of our invention consists essentially of the foregoing mixture with the following limitations:
(i) from about 60 weight percent up to about 96 weight percent on a dry basis of a substance selected from the group consisting of (a) $KH_2PO_4$ or (b) $K_2HPO_4$ or (c) a mixture of $Mg_3(PO_4)\cdot 4H_2O$ and $K_2CO_3$;
(ii) from about 0.4 up to about 3.5 weight percent on a dry basis of lactic acid;
(iii) from about 0.4 up to about 17.0 weight percent on a dry basis of a compound selected from the group consisting of sodium chloride, potassium chloride and calcium chloride;
(iv) from about 1.75 up to about 3.25 weight percent on a dry basis of monosodium glutamate or monopotassium glutamate or a mixture of same; and, in addition
(v) from about 4.0 weight percent up to about 25.0 weight percent of a compound selected from the group consisting of $MgCO_3$, $KHCO_3$ and $NaHCO_3$ (with the proviso that the sum total of the ingredients cannot be greater than 100%).

We have discovered that the foregoing composition brings out the bloody, "rare meat" notes in meat flavored foodstuffs, e.g., hamburgers, sausages, steaks and the like. Furthermore, the foregoing composition causes vegetarian meat compositions to have a "rare meat" note thereby causing these vegetarian meat compositions to be more palatable and aesthetically pleasing. We have also discovered that the use of the foregoing compositions enhances the flavor of cheese snack foods and brings out the natural cheese character of the cheese snack foods while requiring a lesser quantity of sodium chloride than that ordinarily required in such cheese snack foods.

According to the present invention 3,5'-nucleotides or their alkali metal salts may be also used in conjunction with the salts and the sclareolide but, in all cases the amount of 5'-nucleotide which is useful is much less than that ordinarily required as in the case of, for example, U.S. Pat. No. 3,318,710 issued on May 9, 1967.

The foregoing salt/sclareolide composition aids in elimination of the well known "potassium ion after taste" in, for example, barbecue types of tastes and, in a number of examples can substantially or even entirely replace sodium salts and/or monosodium glutamate with a non-sodium ion and/or non-glutamate ion containing substances.

The mixed seasonings according to the present invention can be used to alter, vary, fortify, modify, enhance or otherwise improve the organoleptic properties, including flavor and/or aroma, of a wide variety of materials which are ingested, consumed, or otherwise organoleptically sensed by mammalian species including human beings and pets, e.g., cats and dogs.

The term "alter" in its various forms will be understood herein to mean the supplying or imparting a flavor character or note to an otherwise bland, relatively tasteless substance, or augmenting an existing flavor characteristic where the natural flavor is deficient in some regard, or supplementing the existing flavor or aroma impression to modify the organoleptic character. The materials which are so altered are generally referred to herein as consumable materials.

Such mixed seasonings according to the present invention are accordingly useful in flavoring compositions. Flavoring compositions are herein to mean those which contribute a part of the overall flavor impression by supplementing or fortifying a natural or artificial flavor in a material, as well as those which supply substantially all the flavor and/or aroma to a consumable article.

The term "foodstuff" as used herein includes both solid and liquid ingestible materials for man or animals, which materials usually do, but need not, have nutritional value. Thus, foodstuffs includes meats, gravies, soups and convenience foods, vegetables, snack foods, dog and cat foods, other veterinary products, and the like.

When the mixed seasonings according to this invention are used in a food flavoring composition, they can be combined with conventional flavoring materials or adjuvants. Such coingredients or flavoring adjuvants are well known in the art for such use and have been extensively described in the literature. Apart from the requirement that any such adjuvant material be ingestibly acceptable, and thus non-toxic or otherwise non-deleterious, conventional material can be used and broadly include other flavor materials, vehicles, stabilizers, thickeners, surface active agents, conditioners and flavor intensifiers.

Examples of preferred co-flavoring adjuvants are:
Methyl thiazole alcohol (4-methyl-5-β-hydroxyethyl thiazole);
2-Methyl butanethiol;
4-Mercapto-2-butanone;
3-Mercapto-4-pentanone;
1-Mercapto-2-propanone;
Benzaldehyde;
Furfural;
Furfural alcohol;
2-Mercapto propionic acid;
2-Methylfuran-3-thiol;

2-Methyldihydrofuran-3-thiol;
2-Methyltetrahydrofuran-3-thiol;
2-Ethylfuran-3-thiol;
2-Ethyldihydrofuran-3-thiol;
Methyl pyrazine;
2-Ethyl-3-methyl pyrazine;
Dipropyl disulfide;
Methyl benzyl disulfide;
Allyl thiophenes;
2-Butyl thiophene;
2,3-Dimethyl thiophene;
5-Methyl furfural;
Acetyl furan;
2,4-Decadienal;
Guiacol;
Phenyl acetaldehyde;
ς-Decalactone;
d-Limonene;
Acetoin;
Amyl acetate;
Maltol;
Ethyl butyrate;
Levulinic acid;
Piperonal;
Ethyl acetate;
n-Octanal;
n-Pentanal;
2,4-Pentadienal
2,4,5-Trimethyl-Δ3-oxazoline
n-Hexanal;
Diacetyl;
Monosodium glutamate;
Sulfur-containing amino acids;
Cysteine;
Hydrolyzed vegetable protein;
Hydrolyzed fish protein; and
Tetramethylpyrazine.

The mixed seasonings, (including sclareolide having the structure:

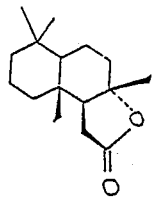

or the compositions incorporating them, as mentioned above, can be combined with one or more vehicles or carriers for adding them to the particular product. Vehicles can be edible or otherwise suitable materials such as ethyl alcohols, propylene glycol, water and the like. Carriers include materials such as gum arabic, carragenan, other gums, and the like. The mixed seasonsings according to this invention can be incorporated with the carriers by conventional means such as spray-drying, drum-drying, and the like. Such carriers can also include materials for coacervating the mixed seasonings (and other flavoring ingredients, as present) to provide encapsulated products. When the carrier is an emulsion the flavoring composition can also contain emulsifiers such as mono- and diglycerides of fatty acids and the like. With these carriers or vehicles, the desired physical form of the composition can be prepared.

The quantity of mixed seasonings (including sclareolide having the structure:

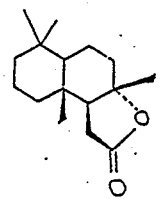

or mixtures thereof utilized should be sufficient to impart the desired flavor characteristic to the product, but on the other hand, the use of an excessive amount of the derivative is not only wasteful and uneconomical, but in some instances too large a quantity may unbalance the flavor or other organoleptic properties of the product consumed. The quantity used will vary depending upon the ultimate foodsuff; the amount and type of flavor initially present in the foodstuff; the further process or treatment steps to which the foodstuff will be subjected; regional and other preference factors; the type of storage, if any, to which the product will be subjected; and the preconsumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff.

It is accordingly preferred that the ultimate foodstuff (e.g., snack or soup or the like) compositions contain:
(i) on a dry basis from about 0.5% up to about 25%; and
(ii) on a wet basis from about 0.02% up to about 1.5%.

More specifically, the range in dry soups is from about 2.0 up to about 10% and the range in the aqueous soup ("ready to eat") is from about 0.05% up to about 0.2%.

The amount of mixed seasonings (including sclareolide having the structure:

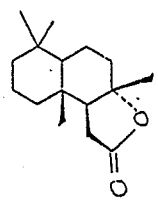

of our invention to be utilized in flavoring compositions can be varied over a wide range depending upon the particular quantity to be added to the foodstuff. Thus, amounts of one or more seasonings according to the present invention, of from about 0.5% up to 100% of the total "flavoring" composition can be incorporated in such compositions. Thus, for example, in snack foods, between 30 and 35% of the flavored coating of the snack food is the seasoning of our invention.

C. Use of Sclareolide to Impart Mouthfeel and/or Augment or Enhance Flavor of Textured Fish Products Typically the heat gellable protein paste used in the present invention is surimi (minced meat or flesh) or surimi like paste which is known as the starting material for the preparation of paste products such as kamaboko-type paste products, various sausages, vegetable protein pastes and the like. That is, the paste contains as a major ingredient minced animal meat, minced poultry meat, minced fish or shellfish meat and/or a vegetable protein paste generally having a neutral pH of 6.5 to 7.5 and, if necessary, as minor ingredients salt, starch, egg white, if milk protein, fats and oils, seasonings, spices, flavoring agents, coloring agents, added water or the like.

Thus, for example, the preferred products are described in U.S. Pat. No. 4,784,870 issued on Nov. 15, 1988, the specification of which is incorporated by reference herein.

Our invention specifically pertains to the inclusion of sclareolide in the heat gellable protein paste at concentrations in the range of from about 2 ppm up to 100 ppm.

When the heat gellable protein paste is heated at a neutral pH range it forms a paste product or a paste product-like gel having certain elastic properties. When it is heated under acidic conditions it forms relatively brittle gel or it is hardly gelatinized. In the present invention, the heat gellable protein paste is not limited to the above-mentioned surimi or surimi-like paste and it includes any paste like material having the same gelation properties as those of surimi or surimi-like paste. Furthermore, the present invention includes other forms of textured fish protein, for example, the "frozen surimi" as disclosed in U.S. Pat. No. 4,910,039, the specification of which is incorporated herein by reference. In U.S. Pat. No. 4,910,039, there is described frozen surimi containing an additive which comprises branched dextrins and a surface active agent in a ratio of 100 parts by weight of the branched dextrins to 1-200 parts by weight of the surface active agent and a sugar or sugar alcohol in a sufficient quantity to deodorize or remove fish smell from the the surimi fish meat. Sclareolide useful in our invention provides excellent mouthfeel for this product and also augments or enhances aesthetically pleasing flavor nuances in this frozen surimi product of said U.S. Pat. No. 4,910,039, for example.

Referring again to the disclosure of U.S. Pat. No. 4,785,870, the suitable pH range for the term "acidic" as used herein for example "acidic paste" is 4 to 6.5, preferably 5.5 to 6.2 when using the heat gellable protein paste generally having a neutral pH of 6.5 to 7.5 (hereinafter sometimes merely referred to as "neutral paste") made from minced fish meat and soybean protein, although it varies depending upon the particular neutral paste used.

Generally, by the term "acidic" it is intended to mean such a pH range that, by contacting with the acidic paste, the neutral paste partially forms a brittle or crisp textured when it is gelatinized by heating to provide heterogeneous properties to the final product. When there is little difference between the pH of the acidic paste and that of the neutral paste with which it is to be contacted, modification of the neutral paste is hardly expected and homogeneous texture and mouthfeel like kamaboko-type paste products still remain in the product obtained. On the other hand, when the pH of the acidic paste is too low, it causes difficulty in gathering of doughs and the shape retaining properties are liable to be degraded.

It is also desirable that the acidic paste shows a certain spreadability during the mixing procedure, particularly as it pertains to products containing sclareolide at higher concentration levels. When the consistency of the acidic paste is too low so that the paste is to readily homogenized with the neutral paste, the modification is hardly expected and only a relatively brittle gel is formed. On the other hand, when the acidic paste is too hard to transform it by ordinary mixing procedure (i.e., the paste is hardly formed into a string), it is difficult to mix the acidic paste with the neutral paste such as surimi to provide good heterogeneous properties and modification by spreading of the acidic paste into a mass of the neutral paste to some extent can hardly be expected. It is preferable that the consistency of the acidic paste measured with a "Rheometer" (an apparatus for measuring physical properties manufactured by FUDO KOGYO KK in Japan) is in the range of 400 to 10 g, preferably, 200 to 30 g. (The measurement has been performed by using a plunger having a face area of 0.785 cm$^2$ at the lifting rate of the supporting stand of 2 cm/min at the same temperature as that in a particular mixing operation. However, all data in the examples set forth infra relating to the instant matter were those measured at 5° C.)

D. Use of Sclareolide as Fat Substitute in Ice Cream and the Like

Sclareolide having the structure:

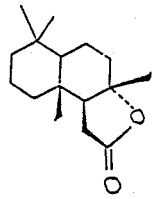

may be used in dairy products such as ice cream, sour cream and whipped toppings. 50 Percent of all of the fat in a full fat chocolate ice cream can be replaced by 2.0% of sclareolide which also improves the iciness, mouthfeel and texture of the fat-reduced product. It can also be used to improve the characteristics of very low fat frozen deserts ... 2½% to chocolate and 1% to a vanilla formulation and the products were very creamy and smooth with a rich mouthfeel.

In ice cream, the sclareolide (as a fat substitute) can be used at the levels of from about 0.5% up to about 5% by weight of the ice cream. The same holds true for sour cream and whipped toppings.

The following examples are given to illustrate embodiments of the invention as it is preferred to practice it. It will be understood that these examples are illustrative and the invention is not to be considered as restricted thereto except as indicated in the appended claims.

EXAMPLES I-VII

The following table sets forth mixtures of salts (with each salt given as a weight percentage) to produce the mixed seasonings of our invention. Each mixture is given as a separate example. Each of the mixtures of each of the examples will be used in examples following Example XVI.

TABLE I

| | EXAMPLE | | | | | | |
|---|---|---|---|---|---|---|---|
| Ingredient | I | II | III | IV | V | VI | VII |
| KH$_2$PO$_4$ | — | 72.38 | 73.12 | 72.42 | 75.62 | — | — |
| Lactic Acid 22% | 3.09 | 2.09 | 2.11 | 2.09 | 2.18 | 3.0 | 2.29 |
| Glycolic Acid 85% | 0.08 | 0.05 | — | — | — | — | — |
| Mg$_3$(PO$_4$)$_2$.4H$_2$O | 10.90 | — | — | — | — | — | — |
| CaHPO$_4$.2H$_2$O | 0.90 | 0.61 | — | 0.61 | 0.50 | 0.70 | — |
| NaCl | 5.24 | 3.54 | 3.58 | 3.54 | 3.70 | 5.10 | 15.22 |
| KCl | 0.52 | 0.35 | — | 0.35 | 0.38 | 0.50 | 0.38 |
| Monosodium Glutamate.H$_2$O | 2.90 | 1.96 | 1.98 | 1.96 | 2.06 | 2.82 | 2.15 |

TABLE I-continued

| Ingredient | EXAMPLE | | | | | | |
|---|---|---|---|---|---|---|---|
| | I | II | III | IV | V | VI | VII |
| NaHCO$_3$ | 22.02 | — | 15.04 | 14.90 | 15.56 | 21.38 | — |
| KHCO$_3$ | — | 14.89 | — | — | — | — | — |
| K$_2$CO$_3$ | 54.35 | — | — | — | — | — | — |
| MgCO$_3$ | — | 4.13 | 4.17 | 4.13 | — | — | — |
| K$_2$HPO$_4$ | — | — | — | — | — | 66.50 | 79.24 |
| Calcium Chloride | — | — | — | — | — | — | 0.72 |
| Sclareolide | 0.12 | 0.12 | 0.12 | 0.12 | 0.12 | 0.12 | 0.12 |

EXAMPLES VIII–XVI

The following Table II sets forth mixtures of non-sodium-containing salts to produce mixed seasonings of our invention. Each mixture is given as a separate example. Each of the mixtures of each of the examples will be used in examples following the instant Examples VIII–XVI.

| Ingredient | Parts by Weight |
|---|---|
| L-Cysteine hydrochloride | 0.09 |
| Carbohydrate-free vegetable protein hydrolysate | 30.09 |
| Thiamine hydrochloride | 0.9 |
| Water | 67.30 |

The resulting mixture is then aged for three days and an aliquot portion is withdrawn and dried. Based on the weight of the dry solid obtained, sufficient gum arabic is added to the batch to provide a composition containing one part by weight of gum arabic. The composition is then spray-dried.

Ethyl(2-methyl-3-furyl) disulfide is added to the spray-dried material at the rate of 4 ppm.

The resulting material has a beef liver flavor. To this material is added, in separate portions, each of the mixed seasonings of any one of Examples I–XVI at

TABLE II

| Ingredient | EXAMPLE | | | | | | | | |
|---|---|---|---|---|---|---|---|---|---|
| | VIII | IX | X | XI | XII | XIII | XIV | XV | XVI |
| KH$_2$PO$_4$ | 90.98 | 85.94 | 89.16 | 94.06 | 86.61 | 92.18 | 95.90 | 79.24 | 93.84 |
| Lactic Acid 22% | 2.62 | 2.48 | 2.57 | 4.24 | 3.91 | 4.16 | 2.77 | 2.29 | 2.71 |
| CaHPO$_4$.2H$_2$O | 0.77 | 0.72 | 0.75 | 0.99 | 0.91 | 0.97 | — | — | — |
| CaCl$_2$ | — | — | 0.43 | — | — | — | 0.87 | 0.72 | 0.85 |
| KCl | 0.44 | 3.96 | — | 0.71 | 5.75 | 0.69 | 0.46 | 15.60 | 0.45 |
| MgCO$_3$ | 5.19 | 4.90 | 5.08 | — | — | — | — | — | — |
| Monopotassium Glutamate.H$_2$O | — | 2.00 | 2.00 | — | 2.82 | 2.00 | — | 2.15 | 2.15 |
| Sclareolide | 0.24 | 0.24 | 0.24 | 0.24 | 0.24 | 0.24 | 0.24 | 0.24 | 0.24 |

The foregoing examples, shown in mole percents of anions, cations and substantially nonionic acids (e.g., lactic acid) are set forth in terms of such ions and free acids in Table III below.

levels of 4%, 8%, 12%, 15% and 25%.

Each of the resulting materials has an excellent "rare" beef liver flavor which can be added to "well done" cooked liver in the form of gravies causing the "well

TABLE III

| Ingredient | EXAMPLE | | | | | | | | |
|---|---|---|---|---|---|---|---|---|---|
| | VIII | IX | X | XI | XII | XIII | XIV | XV | XVI |
| K$^+$ | 45.3% | 45.6% | 45.5% | 49.30% | 49.3% | 49.3% | 49.0% | 49.2% | 49.0% |
| H$_2$PO$_4^-$ | 45.0% | 41.6% | 44.4% | 48.60% | 43.2% | 47.9% | 48.6% | 35.7% | 47.8% |
| HPO$_4^=$ | 0.3% | 0.276% | 0.297% | 0.402% | 0.359% | 0.399% | — | — | — |
| Ca$^{++}$ | 0.3% | 0.277% | 0.297% | 0.722% | 0.359% | 0.399% | 0.545% | 0.401% | 0.515% |
| Cl$^-$ | 0.398% | 3.5% | 0.392% | 0.662% | 5.25% | 0.658% | 1.51% | 13.61% | 1.49% |
| Mg$^{++}$ | 4.15% | 3.84% | 4.11% | — | — | — | — | — | — |
| CO$_3^=$ | 4.15% | 3.84% | 4.11% | — | — | — | — | — | — |
| Lactic acid | 0.434% | 0.396% | 0.425% | — | 0.646% | 0.694% | 0.465% | 0.342% | 0.458% |
| Glutamate ion | — | 0.65% | 0.668% | — | 0.942% | 0.696% | — | 0.650% | 0.735% |

Table IV below sets forth the mole ratio of metal cation (e.g., potassium ion, calcium ion and magnesium ion) to total moles of anion, cation and free acid, e.g., lactic acid.

done" cooked liver to have a rare flavor nuance.

EXAMPLE XVIII

A beef liver gravy is made by formulating a composi-

TABLE IV

| Ingredient | EXAMPLE | | | | | | | | |
|---|---|---|---|---|---|---|---|---|---|
| | VIII | IX | X | XI | XII | XIII | XIV | XV | XVI |
| Mole ratio of metal cation: anion + cation + free acids | 0.498 | 0.499 | 0.498 | 0.497 | 0.497 | 0.496 | 0.495 | 0.496 | 0.496 |

The mixed seasonings of Example I–XVI are used in the following Example XVII, et seq.:

EXAMPLE XVII

The following ingredients are refluxed for four hours:

tion in the amounts indicated:

| Ingredients | Parts by Weight |
|---|---|
| Cornstarch | 10.50 |
| One of the final product of Example VIII | 3.00 |

-continued

| Ingredients | Parts by Weight |
|---|---|
| Caramel color | 0.30 |
| Garlic powder | 0.05 |
| White pepper | 0.05 |
| Sodium Chloride | 1.90 |
| Monosodium glutamate | 0.20 |

To one unit of gravy flavor concentrate, six ounces of water is added and the mixture is stirred thoroughly to disperse the ingredients, brought to a boil, simmered for one minute, and served. This "meatless" gravy exhibits an excellent rare beef-liver flavor.

EXAMPLE XIX

Seven ppm of ethyl (2-methyl-3-furyl) disulfide is added to beef broth prepared from a commercial dried mixture and 250 ml hot water. To the resulting material is added at a level of 0.1% each of the mixed seasonings of Examples I-XVI. The ethyl (2-methyl-3-furyl) disulfide increases the beef-liver character and imparts a pleasant nutty note. The mixed seasonings cause the overall beef broth to have a "rare liver" nuance. The resultant beef broth has an excellent improved more blended meaty/rare flavor than does the unflavored beef broth.

EXAMPLE XX

The following ground sausage mixture is prepared:

| Ingredient | Parts by Weight |
|---|---|
| Ground beef | 200.0 |
| Beef suet | 120.0 |
| Ice/NaCl (50:50 mixture) | 200.0 |
| Potato flour | 100.0 |
| Anhydrous bread crumbs | 140.0 |
| Dry milk powder | 20.0 |
| Standard spice flavor containing: | 10.0 |
| Oil of cumin | 1.6 |
| Oil of mustard | 3.3 |
| Oil of celery | 3.3 |
| Oil of ginger | 5.2 |
| Oil of cloves | 14.3 |
| Oil of coriander | 17.6 |
| Oil of pimenta berries | 22.0 |
| Oil of black pepper | 43.0 |
| Oleoresin capsicum | 373.0 |
| Oil of nutmeg | 500.0 |

To the above mixture 0.02% by weight of the following mixture is added:

| Ingredient | Parts by Weight |
|---|---|
| n-Propyl (2-methyl-3-furyl) disulfide | 5.0 |
| Ethyl alcohol (95%) | 95.0 |

To the resulting mixture is added at a level of 100 parts by weight to seven portions of the resulting mixture are added, separately, each of the mixed seasonings produced according to Examples I-XVI.

The resulting mixtures are then formed into sausages and encased in the usual manner. The encased sausages are heated in water at a temperature of 160°–180° F. for a period of two of the taste of sausage made with natural liver and also containing the rare desirable bloody notes.

EXAMPLE XXI

A mixture of 8.8 grams of cysteine-hydrochloride, 8.8 grams of thiamine hydrochloride and 309.4 grams of carbohydrate-free vegetable protein hydrolysate (Nestle 4BE) is brought to a standard weight of 1000 grams by addition of water and adjusted to a pH of 4.75 with acid or base as required. This mixture is then boiled under reflux conditions at atmospheric pressure for four hours and allowed to cool.

After the mixture is allowed to cool, one gram of isoamyl (2-methyl-3-furyl) disulfide and 0.25 grams of one of the mixed seasonings prepared according to Examples I-XVI is added thereto (seven separate portions of flavor). The resulting mixture thus obtained has an excellent unique roasted, rare bloody liver meaty flavors with chicken meat nuances.

EXAMPLE XXII

The following ingredients are refluxed for four hours:

| Ingredients | Parts by Weight |
|---|---|
| L-Cysteine hydrochloride | 0.9 |
| Carbohydrate-free vegetable protein hydrolysate | 30.9 |
| Thiamine hydrochloride | 0.9 |
| One of the mixed seasonings of one of Examples I-XVI | 7.8 |
| Water | 67.30 |

The resulting mixture is then aged for three days and an aliquot portion is withdrawn and dried. Based on the weight dry solid obtained, sufficient gum arabic is added to the batch to provide a composition containing one part by weight of gum arabic. The composition is then spray-dried.

n-Heptyl (2-methyl-3 furyl) disulfide is added to the spray-dried material at the rate of 4 ppm.

The resulting material has an excellent rare roast beef flavor.

EXAMPLE XXIII

A roast beef gravy is made by formulating a composition in the amounts indicated:

| Ingredients | Parts by Weight |
|---|---|
| Cornstarch | 10.50 |
| The final product of Example XXII | 3.00 |
| Caramel color | 0.30 |
| Garlic powder | 0.05 |
| White pepper | 0.05 |
| Salt | 1.92 |
| Monosodium glutamate | 0.20 |

To one unit of gravy flavor concentrate, 0.2 parts by weight of one of the mixed seasonings of Example I-XVI is added and eight ounces of water is added. The mixture is stirred thoroughly to disburse the ingredients, brought to a boil, simmered for one minute, and served. This "meatless" gravy exhibits an excellent rare roast beef flavor.

EXAMPLE XXIV(A)

Cheese Flavor

Skim milk having 22 percent total solids was heated to 145° F. for 30 minutes to substantially destroy any pathogens and to reduce the number of competitive organisms. The skim milk was then cooled to 92° F. and placed in a sterile fermenter having one-fifth of its volume as a head space. The fermenter was maintained at 92° F. The skim milk was inoculated with approximately 3,000 organisms per gram of the medium of the organism *S.lactis-variation diacetilactis* (citrate fermenter) and approximately 3,000 organisms per gram of the medium of the organisms *S.lactis-variation diacetilactis* (citrate non-fermenter). The skim milk was also inoculated with approximately 2,000 organisms per gram of aqueous medium of *B.megaterium* and approximately 2,000 organisms per gram of the medium of *B.megaterium*. The inoculated skim milk was maintained at 92° F. for 5 days during which the organisms therein proliferated.

EXAMPLE XXIV(B)

Production of the Cheese Flavor

Skim milk having 15 percent total solids was heated to 145° F. for 30 minutes to substantially destroy pathogens and to reduce the number of competitive organisms. The skim milk was cooled to 92° F. and placed in a fermenter maintained at 92° F. The skim milk was then inoculated with the product of Example XXIV(A) wherein the resulting inoculated skim milk had a total of approximately 10,000 organisms per gram of skim milk and a ratio of the Bacillus organisms to the Streptococcus organisms was approximately 60/40. The inoculated skim milk was stirred for 35 minutes to disperse the organisums therein. The inoculated skim milk was then sealed in an airtight manner in the fermenter and 1/5 of the volume of the fermenter remained as a head space. Fermentation was carried out at 95° F. for three days. Thereafter, the fermenter was opened under a blanket of nitrogen and cut particles of naturally produced cheddar cheese was placed in the fermentation medium. The amount of cheese added, on a solid basis of the fermentation medium and cheese added, was approximately 33 percent by weight. The fermenter was closed and stirring was carried out until the cheese was suspended. The stirring time was about 1½ hours. Fermentation was then allowed to resume for an additional one day. The mixture of cheese and fermentation produced was pasteurized at 145° F. for 30 minutes and then spray dried in a conventional manner to a fine powder having a complete cheddar cheese taste and taste feel.

EXAMPLE XXIV(C)

On a dry basis was mixed 50 percent solids of Examples XXIV(B) 31.3 percent acid whey powder, 4 percent mixed seasonings (individually of one of the Examples I–XVI 5 percent disodium phosphate (a dispersing agent), 0.5 percent USDA Yellow No. 5, the remainder being dry milk solids. After thorough mixing a portion thereof was dispersed with vigorous stirring in water and spray dried to form a cheese flavored powder. The cheese powder was a fine textured powder having a very distinctive and medium degree of improved natural-like cheddar cheese flavor.

EXAMPLE XXIV(D)

A second portion of the product of Example XXIV(C) was mixed with an equal portion of weight of milk solids and produced a cheddar cheese spread of mild cheese flavor.

EXAMPLE XXIV(E)

A third portion of the product of Example XXIV(C) was mixed with an equal portion of vegetable fats and produced a mild cheddar cheese dip.

EXAMPLE XXIV(F)

Equal portions of the product of Example XXIV(C) and whey solids were mixed to produce a medium to mild cheese flavored powder for sprinkling on salads and the like.

EXAMPLE XXIV(G)

On a dry weight basis, there was mixed 50 percent of the fermented solids of Example XXIV(B), 25 percent acid whey powder, 15 percent butter fat, 0.5 percent Atmos 150, 4 percent of one of the mixed seasonings of Example I–XVI, 5 percent disodium phosphate and 0.5 percent USDA Yellow No. 5. This product after being thoroughly mixed was cut into wedges and produced an excellent natural like cheddar cheese flavor product.

EXAMPLE XXV

Dry Soup Mix

The following dry soup mix is prepared:

| Ingredients | Parts by Weight |
| --- | --- |
| Chopped chicken fat | 3.0 |
| Ground chicken meat | 4.0 |
| Mixed seasoning of one of Examples I–XVI | 8.0 |
| Monosodium glutamate | 6.0 |
| Dextrose | 3.0 |
| Onion powder | 0.7 |
| Enxymatically hydrolyzed yeast | 0.5 |
| Turmeric | 0.118 |
| Parsley | 0.04 |
| Sage | 0.01 |
| Noodles | 32.0 |

The mixture is then simmered in 800 cc. of water for 7 minutes, and soup having a seasoned chicken flavor results and even more improved chicken flavor results when chicken fat employed is first mixed with 0.18 cc. of ethanol containing 10% by weight of arachidonic acid.

EXAMPLE XXVI

Two chicken flavors are prepared by refluxing the following ingredients at about 95° C. for 2 hours:

| Ingredients | A | B |
| --- | --- | --- |
| Corn gluten hydrolysate | 37.92 | 45.17 parts |
| Xylose | 0.19 | 0.5 |
| Thiamine HCl | 1.14 | 1.5 |
| Nucleotides* | 0.75 | — |
| Mixed seasonings of Example IV | 0.35 | 0.42 |
| Water | 60.00 | 52.00 |

*50/50 mixture of sodium inosinate and sodium guanylate.

After drying, 16.31 parts of autolysed yeast extract are added to formula A. The product of formula B is dry blended with 19.43 parts of autolysed yeast and 0.83 parts of nucleotides. Both products have a very pleasant seasoned chicken flavor.

EXAMPLE XVII

Bologna Sausage

Beef and pork were separately treated and left to stand for 2 days to be impregnated with one of the mixed seasonings of Examples I–XVI, and potassium nitrate added thereto. Then, they were removed and ground by separate meat choppers. Lean meat from each ground meat was put together and treated by a cutter. To the mixed meat being cut, 5'-guanylic acid was added in the form of the calcium salt in one sample lot and the disodium salt in the other sample lot, in an amount corresponding, as 5'-guanylic acid, to 70 mgs. percent based on the total weight of the meat used. Then, the resultant meat paste, after addition thereto of fat was forced into a tubular case with the aid of a stuffer. The case was bound at intervals of 25 cms. Finally, the case was dried at 40° C. for 1 hour, smoked at 65° C. for 3 hours, heated in water at 75° C. for 1.5 hours, and cooled to provide a Bologna sausage. The residual ratio of 5'-guanylic acid in the product incorporating its calcium salt was found to be 60% was compared with 32% in Bologna sausage had excellent seasoned meat flavor highly superior to Bologna sausages known in the prior art.

EXAMPLE XXVIII(A)

To 6.4 grams of 4-hydroxy-2,5-dimethyl-2,3-dihydrofuran-3-one in a buffer solution containing about 35 grams sodium acetate, about 14 grams of acetic acid and 400 ml of water (pH 5.0), a solution of 12 grams of sodium sulphide ($Na_2S.9H_2O$) in 200 ml of water was added over a period of 30 minutes. The mixture was then boiled under reflux conditions at atmospheric pressure for 2 hours and allowed to cool. The pH was then 6.6.

EXAMPLE XXVIII(B)

A gravy was prepared from the following ingredients:

| Ingredients | Grams |
| --- | --- |
| Potato starch | 15.0 |
| Onion powder | 2.5 |
| Monosodium glutamate | 3.0 |
| Beef tallow | 20.0 |
| Flour | 15.0 |
| Caramel | 1.6 |
| Pepper | 0.02 |
| Bayleaves | 0.02 |
| Clove | 0.02 |
| One of the mixed seasonings of Examples I–XVI | 8.0 |
| Protein hydrolysate | 4.0 |
| Beef extract powder | 2.0 |
| Tomato powder | 1.0 |
| | 72.16 |

The potato starch and flour were added to the molten beef tallow at 60° C. under continuous stirring. The other ingredients were well blended and likewise added to the beef tallow. The whole mixture was boiled in 1 liter of water.

The gravy so obtained was divided into two portions of 500 ml. In the first portion 250 mg of malto-dextrin was dissolved; in the second portion 250 mg of the flavour powder prepared according to Example XXVIII(A). Both gravies were assessed in a paired comparison test by a panel consisting of 12 persons.

The gravy containing the flavour powder was preferred by 10 out of the 12 tasters because of its more pronounced fried-meat flavour with an excellent bloody note.

EXAMPLE XXIX

The following ingredients were introduced into a cooking vessel and heated to popping temperature:

| Ingredient | |
| --- | --- |
| Encapsulated Bleu Cheese Flavor | 3.6 grams |
| Soybean Oil | 55 cc's |
| Popcorn | 80.0 grams |
| The mixed seasoning of Example III | 4.0 grams |

The resulting popcorn had a decided blue cheese flavor which was excellently seasoned which was uniformly distributed and did not lose potency of the flavor or the seasoning after several days.

A method of production is set forth in detail in U.S. Pat. No. 4,096,281 issued on June 20, 1978 the disclosure of which is incorporated by reference herein.

EXAMPLE XXX

Sclareolide having the structure:

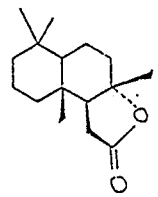

is added to a cup of black coffee at the rate of 0.001 ppm, the bitterness of black coffee is significantly depressed compared to a cup of black coffee not containing the sclareolide.

The sclareolide added to the cup of black coffee at the rate of 0.001 ppm is now made up into solution containing 0.1% sclareolide at the rate of 1% in 95% aqueous food grade ethanol. The 95% food grade ethanol solution of the sclareolide is then added to water to cause the solution to be a concentration of 0.01% (with respect to sclareolide) in the resulting solution. This solution is then sprayed onto roasted coffee grounds whereby the concentration of the sclareolide based on the dry weight of coffee grounds is 0.001 ppm. When the coffee grounds are extracted and used for producing coffee beverages whether with or without cream, the resulting coffee beverages' bitterness is significantly depressed compared to coffee beverages not containing the sclareolide.

EXAMPLE XXXI

Two samples of (1) 0.04 weight percent aqueous solution of aspartame and (2) a solution obtained by adding 2.5 ppm of sclareolide to the 0.04 weight percent aqueous solution of aspartame were evaluated by the count method with trained panels of 20 using 5% aqueous solutions of sucrose as a control. The results are set forth in Table V. In the aqueous solution added with the sclareolide, it was evaluated that a sweet aftertaste and luscious taste were restrained and is rich taste was strengthened to thereby markedly improve the quality of aspartame. With the concentration of sclareolide in this experiment, no additional aesthetically displeasing taste was added. However, the mouthfeel of the resulting solutions were improved with this sclareolide.

TABLE V

| | Solution(1) | Solution(2) | Significance of Difference (ii) |
|---|---|---|---|
| Aftertaste of sweetness (i) | −1.9 | −0.6 | ++ |
| Luscious taste of sweetness | −1.7 | +0.5 | ++ |
| Rich taste of sweetness | −1.1 | −0.4 | + |

(i) Criteria for evaluation
−3 Very weak
−2 Considerably weak
−1 Somewhat weak
0 Same as sucrose
+1 Very strong
(ii) Significance of difference
++ Significant difference in 1% rate
+ Significant difference in 5% rate
− No significant difference.

EXAMPLE XXXII

Two samples of (1) 0.04 weight percent aqueous solution of aspartame and (2) a solution obtained by adding 1.5 ppm of sclareolide to 0.04 weight percent aqueous solution of aspartame were evaluated by the count method with trained panels of 20 using 5% aqueous solution of sucrose as a control. The results are shown in Table VI. In the aqueous solution added with the sclareolide, it was evaluated that a sweet aftertaste and luscious taste were restrained and its rich taste was strengthened thereby to markedly improve the taste quality of aspartame. With the added concentration of this no aesthetically displeasing taste of sclareolide was determined to exist. Indeed, the sclareolide improved the mouthfeel of the solutions.

TABLE VI

| | Solution(1) | Solution(2) | Significance of Difference (ii) |
|---|---|---|---|
| Aftertaste of sweetness (i) | +1.9 | +0.5 | ++ |
| Luscious taste of sweetness | +1.7 | 0.7 | ++ |
| Rich taste of sweetness | −1.1 | −0.5 | + |

(i) Criteria for evaluation
−3 very weak
−2 considerably weak
−1 somewhat weak
0 same as sucrose
+1 very strong
(ii) Significance of difference
++ Significant difference in 1% rate
+ Significant difference in 5% rate
− No significant difference

EXAMPLE XXXIII

To 200 liters of low fat milk (10% of the fat of "full-cream milk") heated to 40° C., 3 kg of 10% low fat milk powder were added with agitation. The resulting mixture was heated to 60° C. and homogenized at 150 atmospheres while adding at the rate of 0.01% sclareolide having the structure:

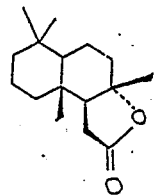

Then it was further heated to 83° C. and this temperature maintained during 5 to 6 minutes, whereafter the mixture was cooled to 48° C. and drawn off into 5 cans each having a volume of 40 liters. As soon as the temperature of the mixture was 25° to 45° C. the contents of the cans were inoculated with 2.5% by volume of an aqueous culture of bacteria such as *Lactobacillus bulgaricus*. Incubation was carried out at about 25° to 45° C. until the acidity was about 40–43 degrees Soxhlet-Henkel (about 3 hours). The cans were then stored for at least 24 hours in a cold storage room at 4° to 6° C. During this storage the biological acidulation took place and a firm structure was formed which is necessary for subsequent obtention of the final cream-like structure of the ice-cream. After storage the solidified base mixture was stirred once, whereafter the cream-like structure was obtained. To this mixture 40 kilograms of sugared pineapple fruit or other fruits were added whereafter the mixture was stirred once more. The resulting mixture was then stored in the refrigerator. The use of the sclareolide improved the iciness, mouthfeel and texture of the fat-reduced product.

EXAMPLE XXXIV

One hundred parts per million of sclareolide is added to a 2% sucrose solution. The sclareolide-containing sucrose solution is compared with a plain 2% sucrose solution, and the sclareolide-containing solution is found to have a greatly enhanced sweetness. Moreover, the duration of sweetness in the enhanced sucrose solution is very appreciably greater than that of the plain sucrose solution.

EXAMPLE XXXV

One hundred parts per million of tetramethylpyrazine and one hundred parts per million of sclareolide is added to a 2% sucrose solution. The pyrazine/sclareolide-containing sucrose solution is compared with (a) a plain 2% sucrose solution, and (b) a 2% sucrose solution containing tetramethylpyrazine only and (c) a 2% sucrose solution containing sclareolide only. The most enhanced sweetness (10 on a scale of 1 to 10) is that of the sclareolide/tetramethylpyrazine-containing solution at a level of 7 on a scale of 1 to 10 is the sclareolide-containing solution. At a level of 5 on a scale of 1 to 10 is the tetramethylpyrazine (only) containing solution.

EXAMPLE XXXVI

A solution for the evaluation of bitterness is prepared by adding 0.02 grams of nargingin in 200 ml of water. The solution is divided into two equal portions and 100 ppm of sclareolide is added to one portion. The tastes of the two portions are compared and the sclareolide-containing solution is found to reduce the bitter taste of the solution.

EXAMPLE XXXVII

Two samples of a commercial peanut butter are admixed with sclareolide and tetramethylpyrazine so that one sample contains 10 ppm of the pyrazine and 8 ppm of sclareolide and the other sample contains 30 ppm of the pyrazine and 8 ppm of sclareolide. These samples are compared with a sample of untreated peanut butter by a trained flavor evaluation panel. The sample containing 10 ppm of the pyrazine and the sample containing 30 ppm of the pyrazine each have greatly enhanced taste and aroma. An additional sample containing 10 ppm of the pyrazine but no sclareolide is no different from the untreated sample.

EXAMPLE XXXVIII

A blue cheese-type flavoring material is prepared by combining ingredients as follows:

| Ingredient | Parts by Weight |
| --- | --- |
| Caprylic acid | 129.7 |
| Acetic acid | 135.2 |
| Methyl-n-amyl ketone | 205.4 |
| Butyric acid | 237.8 |
| Caproic acid | 291.9 |
| | 1,000.0 |

The so prepared is added to 2,632,000 parts of a sour cream dip preparation to provide a blue cheese-flavored sour cream dip.

Samples of the dip are evaluated with no additive and with 12.5, 25, and 50 ppm of sclareolide added. The evaluation is carried out by a select panel of flavor evaluators.

Samples containing 12.5 and 25 ppm of sclareolide are judged to be less pungent and more blue cheese-like in odor and to possess more "body" and overall flavor quality than a control material containing no sclareolide.

EXAMPLE XXXIX

The Salt-Sparing Effect of Sclareolide

Step 1

The following mixture is prepared:

| Ingredients | Parts by Weight |
| --- | --- |
| Deionized Water | 706.97 |
| Sodium Chloride | 8.64 |
| Sodium Acetate.3H$_2$O | 34.56 |
| COROLASE PN ® PN (a protease enzyme marketed by Rohn Teck Darmstadt, Division of Wacker Chimie) | 4.19 |
| MFP Conc.(Marshall Fungal Protease marketed by the Marschall division of Miles division of Haarman and Reimer division of Bayer Chemicals A.G.) | 5.58 |
| Non-fat dry milk (marketed by Land O'Lakes Inc. of Minnesota) | 21.60 |
| Fructose | 8.00 |
| Acid Casein | 170.46 |
| Yeast Extract (Cardi-C-17) water soluble from Brewers Yeast | 40.00 |

The resulting mixture is used in Step 2.

Step 2

The following mixture is prepared:

| Ingredients | Parts by Weight |
| --- | --- |
| Mixture according to Step 1 | 949.72 |
| 35% Aqueous Potassium Hydroxide | 50.28 |

The resulting mixture is placed in a three neck reaction vessel equipped with stirrer, thermometer and overhead distillation column.

650 parts water is distilled off yielding a pot residue of 35%.

The pot residue is used in Step 3.

Step 3

The following mixture is prepared:

| Ingredients | Parts by Weight |
| --- | --- |
| Product of Step 2 | 950.00 |
| Monosodium Glutamate | 50.00 |

The resulting product is used in Step 4.

Step 4

The following mixture is prepared:

| Ingredients | Parts by Weight |
| --- | --- |
| Product of Step 3 | 948.00 |
| NEOBEE ® M-5 ® a C$_8$—C$_{10}$ (Coconut fatty ester of glycerine Marketed by the Drew Chemical Division of PVO International) | 50.00 |
| Sclareolide | 2.00 |

The resulting mixture is used in Step 5.

Step 5

The product of Step 4 is added to CAMPBELL's ® Tomato soup reduced in salt content by 33%, with the blevel of sclareolide being applied at the rate of 0.5 ppm. Thus, the flavor of Step 4 is added to the CAMPBELL's ® soup at the rate of 0.025%. The resulting product gives rise to the same degree of saltiness as if no salt reduction took place with respect to the CAMPBELL's ® Tomato soup.

This shows that the level of sclareolide used for its salt-sparing effect may be as low as about 0.5 ppm. The range of use of sclareolide may be from about 0.5 ppm up to about 100 ppm with regard to its salt-sparing capacity.

EXAMPLE XL

Effect of Sclareolide on Perception of Saltiness and Bitterness

Six tasters were asked to determine if saltiness by sodium chloride in spring water could be enhanced by addition of potassium chloride and sclareolide in combination. To do this four samples were prepared. The first contained 1.0% sodium chloride and the second 0.75% sodium chloride. The third contained 0.75% sodium chloride admixed with 0.32% potassium chloride. The fourth was a repeat of the third experiment but also contained 0.5 ppm of sclareolide dissolved in ethanol.

Five out the six tasters found the first sample to be the most salty. The fourth sample was the next most salty and was devoid of bitterness and medicinal/chloride taste which was repeatedly observed in the third sample. The fourth sample had some slight side effects but was more pleasant and acceptable than the third. One taster found the fourth sample to have equal saltiness to that of Sample 1.

The conclusion to be drawn is that potassium chloride partially restored saltiness in a solution containing 25% less sodium chloride but this saltiness effect could be enhanced and bitterness removed if sclareolide is present at a level below its threshold of taste. One taster was able to taste an ethanolic effect imparted by the sclareolide solution which was based on 95% ethanol in water.

EXAMPLE XLI

Effect of Sclareolide on Textured Fish Product

80% parts of minced pollack (S.A. grade), 20 parts of minced pollack (2nd grade)(S.A. grade means a special grade means a special grade according to the standard defined by the Japanese Frozen Fish Meat Association which contains about 77% water. The first grade contains about 78% water and the second grade contains about 79% water.), 8 parts of potato starch, 2 parts of egg white, 2.8 parts of sodium chloride, 40 parts of added water (for thinning), a small amount of seasoning, a red coloring agent and spices were mixed and to the mixture was added an emulsion consisting of three parts of isolated soy bean protein flour, 0.5 parts of soy bean oil and 12 parts of water (hereinafter this mixture is referred to as "Surimi A" pH 6.7).

80 parts Surimi A was mixed with 20 parts of commercially available filled-type soft cheese (manufactured and sold by Fuji Oil Company Limited under the trade name of "QUVARE S" pH 5.4 consistency 150 grams) in a silent cutter for about 5 to 7 seconds to give a desired heterogeneous state wherein soft cheese was suitably extended in Surimi A. Then this mixture was stuffed in plastic casing of 55 mm wide and heated in a steamer at 88° C. to give a gelatinized product.

The same procedures were repeated except that either a relatively harder filled-type cheese (manufactured and sold by Fuji Oil Company Limited under the trade name of "QUVARE D" pH 5.5 consistency 500 grams) cut into small blocks (reference A) or the soft cheese used in the above but adjusted to pH 6.5 with sodium carbonate (consistency: 80 grams) (reference B) with sclareolide added at a rate of 2 ppm was used instead of "QUVARE S" to obtain paste products.

In the product of Example 1 a fatty tissue-like pattern was found in its cross section and its lean meat-like portion showed good texture. When the product was sliced the lean meat-like portion thereof tended to be torn in zig-zag fashion as a meat ham. However, in the product of Reference A most of the cheese blocks remained as they were and no modification of the pastes were observed. The product of Reference A was a kamaboko-like product containing cheese blocks just dotted therein. In the product of Reference B, the texture of the product remained homogeneous, although some fatty tissue-like pattern was observed in its cross section. In Reference B, a pleasant aesthetically pleasing flavor was obtained without any "fishy" notes created when no sclareolide was used. Furthermore, the product of Reference B had an improved mouthfeel with respect to the products where no sclareolide was When sclareolide is used at the following levels, the mouthfeel of each of the foregoing products is improved on a scale of "1–10" from about "2" up to about "9":

10 ppm
15 ppm
20 ppm
25 ppm
30 ppm
50 ppm
75 ppm
90 ppm
1 ppm

The flavor of the foregoing surimi products are still further improved by addition to each of the products of the following fish flavors, prepared in the following manner:

"A fish flavor is prepared by admixing 3 grams of cade oil, 20 mg. 2,4,5 of Trimethyl-$\Delta_3$-oxazoline, 3 mg of 2,4 pentadienal and sufficient cod liver oil to make one kilogram of finished oil.

To five samples of the finished oil the following levels of sclareolide are added:
a. 10 ppm
b. 20 ppm
c. 30 ppm
d. 40 ppm
e. 50 ppm Each of the fish flavors are then added to the foregoing surimi products of Examples 1, Reference A and Reference B in order to produce levels of 0.5 ppm sclareolide in the surimi. Each of the surimi samples in addition to having good mouthfeel properties also had aesthetically pleasing "anchovy" fish flavors with no aesthetically displeasing aftertaste."

EXAMPLE XLII

The Use of Sclareolide to Improve the Mouthfeel of Fish Chowder

A fish flavor is prepared by admixing 3 grams of cade oil, 20 mg of 2,4,5-Trimethyl-$\Delta_3$-oxazoline, 3 g of 2,4 pentadienal and sufficient cod liver oil to make one kilogram of finished oil.

To five samples of this fish flavor, the following levels of sclareolide are added:
a. 10 ppm
b. 20 ppm
c. 30 ppm
d. 40 ppm
e. 50 ppm The foregoing fish flavor samples in the amount of 0.9 cc each are added to 7.3 grams of a soup base consisting of:

| Ingredients | Parts by Weight |
| --- | --- |
| Fine Ground Potassium Chloride | 23.12 |
| Hydrolyzed Vegetable Protein (Nestle 4BE) | 27.40 |
| Monopotassium Glutamate | 5.81 |
| Sucrose | 10.96 |
| Beef Fat | 5.43 |
| Sethness Caramel Colored (Powder B & C) | 2.73 |

The resulting mixture is added to 12 ounces of boiling water to create a soup. Each of the soup products have excellent fish chowder flavors with excellent mouthfeel and the same saltiness as if 35.62 parts fine ground sodium chloride were added instead of the potassium chloride and as if 17.81 parts of monosodium glutamate were added instead of the monopotassium glutamate.

EXAMPLE XLIII 1 gram of each of the fish flavors of Example XLII is emulsified in a solution containing the following ingredients:

| Ingredients | Amount of (Grams) |
|---|---|
| Gum Arabic | 100 |
| Water | 300 |
| Butylated Hydroxyanisol (20% solution in ethanol) | 0.51 |

The resulting emulsion is spray-dryed in Bowen lab model spray dryer with inlet temperature of 500° F. and outlet temperature of 200° F. 12 grams of the spray-dryed material is mixed with 29.4 grams of the soup base as set forth in Example XLII. The resulting mixtures are then added to 12 ounces of boiling water and an excellent fish chowder is obtained with good mouthfeel and saltiness as set forth in the preceding Example XLII.

What is claimed is:

1. A textured fish product having added thereto from 0.5 to 100 ppm of sclareolide having the structure:

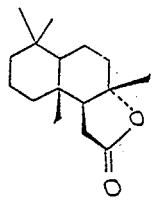

* * * * *